(12) United States Patent
Salgo

(10) Patent No.: US 6,435,995 B1
(45) Date of Patent: Aug. 20, 2002

(54) DRIVE SYSTEM FOR AN INVERSE KINEMATICS DEVICE

(75) Inventor: Reinhold C. Salgo, Wald (CH)

(73) Assignee: Oloid AG, Basel (CH)

( * ) Notice: Subject to any disclaimer, the term of this patent is extended or adjusted under 35 U.S.C. 154(b) by 0 days.

(21) Appl. No.: 09/463,044

(22) PCT Filed: Jun. 1, 1999

(86) PCT No.: PCT/CH99/00236

§ 371 (c)(1),
(2), (4) Date: Apr. 13, 2000

(87) PCT Pub. No.: WO99/57461

PCT Pub. Date: Nov. 11, 1999

(30) Foreign Application Priority Data

Dec. 24, 1998 (CH) .............................................. 2567/98

(51) Int. Cl.$^7$ ................................................. F16H 7/00
(52) U.S. Cl. ..................................................... 474/148
(58) Field of Search ............................... 474/45–57, 87, 474/148, 156, 160, 170; 366/215, 216, 217, 219

(56) References Cited

U.S. PATENT DOCUMENTS

| | | | | |
|---|---|---|---|---|
| 3,610,587 A | * | 10/1971 | Schatz | 259/72 |
| 3,824,866 A | * | 7/1974 | Schatz | 74/61 |
| 4,341,475 A | * | 7/1982 | Saladin | 366/211 |
| 4,445,782 A | * | 5/1984 | Sparrow, Jr. | 366/217 |
| 4,669,225 A | * | 6/1987 | Kuster | 51/163.1 |
| 4,784,338 A | * | 11/1988 | Saladin | 241/101.2 |
| 4,895,453 A | * | 1/1990 | Devlin et al. | 366/219 |
| 5,238,304 A | * | 8/1993 | Zimmermann | 366/219 |
| 5,360,265 A | * | 11/1994 | Cruse | 366/208 |
| 5,492,405 A | * | 2/1996 | Meyer | 366/208 |
| 5,492,406 A | * | 2/1996 | Meyer | 366/208 |
| 5,527,109 A | * | 6/1996 | Meyer | 366/208 |

FOREIGN PATENT DOCUMENTS

| | | | | |
|---|---|---|---|---|
| DE | 12 91 152 B | * | 3/1969 | |
| DE | 23 38 865 A | * | 2/1974 | |
| DE | 35 26 478 A1 | * | 1/1987 | F16H/7/06 |
| DE | WO-93 18850 A | * | 9/1993 | B01F/11/00 |
| GB | 0 655 568 A | * | 5/1995 | F16H/7/02 |
| JP | 01288657 | * | 11/1989 | F16H/7/02 |

* cited by examiner

*Primary Examiner*—David A. Bucci
*Assistant Examiner*—Vicky A. Johnson
(74) *Attorney, Agent, or Firm*—Jenkens & Gilchrist, P.C.

(57) ABSTRACT

A drive for an inverse kinematics device with two parallel axles moved in opposing directions and non-uniformly rotating. The axles have an angular relationship and the drive is supplied externally by at least one essentially uniformly rotating axle. Each of the axles carries an oval wheel, wherein the ovality of the wheels correspond to the angular relationship. The oval wheels are firmly fixed to the associated axle. The periphery of the oval wheels is designed for the positive acceptance of a traction element. At least one uniformly rotating wheel is provided having a periphery designed for the positive acceptance and drive of the traction element. Two traction elements are provided for the transmission of turning moments and power from one of the uniformly rotating wheels onto the oval wheels. Each drive line includes a wheel, traction element and an oval wheel containing an elastic element, which can compensate for impairment of the constancy of peripheral velocity of the oval wheels.

15 Claims, 3 Drawing Sheets a)

b)

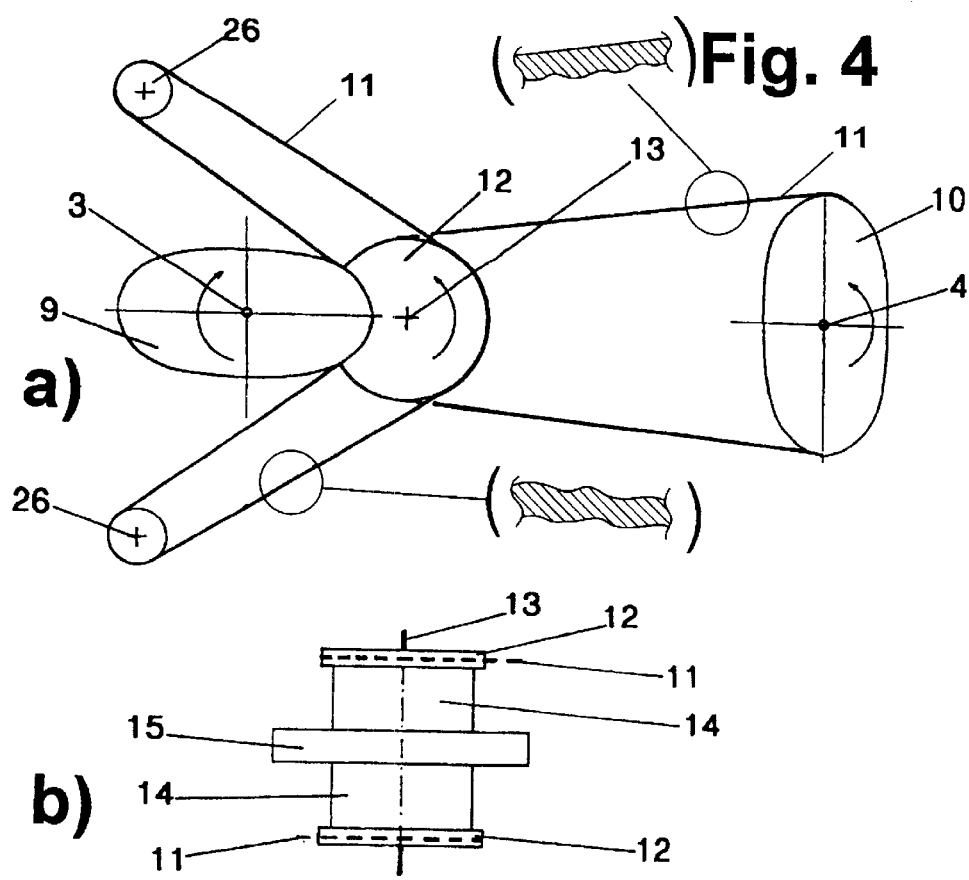
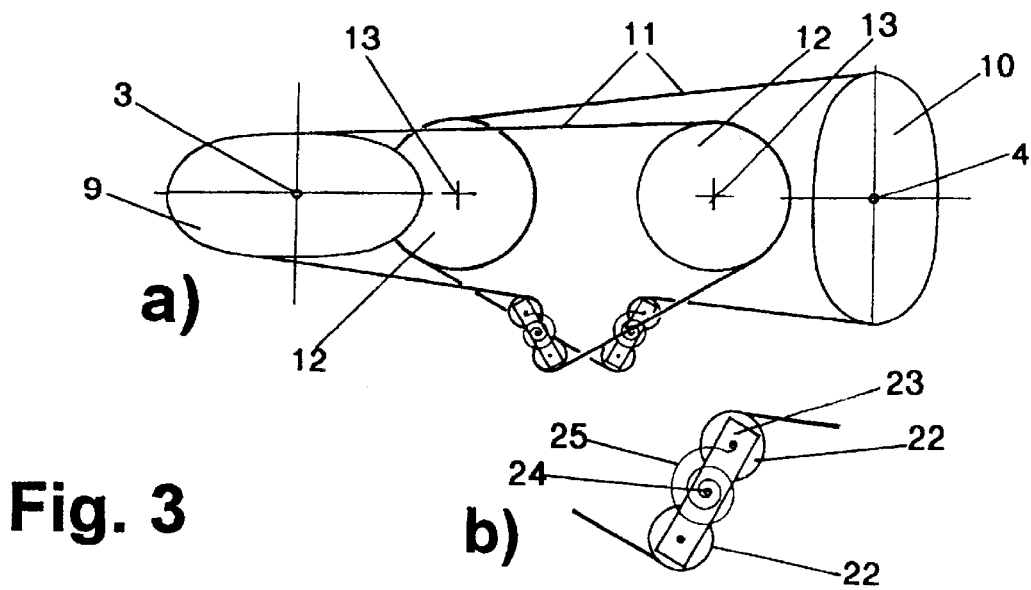

US 6,435,995 B1

DRIVE SYSTEM FOR AN INVERSE KINEMATICS DEVICE

FIELD OF THE INVENTION

The present invention relates to a drive system for an inverse kinematics device according to the preamble to claim 1.

BACKGROUND OF THE INVENTION

Several inverse kinematics devices are known and as a rule go back to Paul Schatz (1898–1979), either directly as the inventor, or indirectly to him as the founder of inverse kinematics (see also: Paul Schatz, Rhymthmusforschung und Technik, Stuttgart 1975).

Such inverse kinematic devices have as a rule two parallel counter rotating axles, whose rotational angle ratio is $$\tan\varphi_1 = \frac{1}{2}\tan\varphi_2$$

and their unequal angular velocities conform to the equation $$\frac{\omega_1}{\omega_2} = 2\frac{1 + \frac{1}{4}\tan^2\varphi_1}{1 + \tan^2\varphi_1}$$

in so far as $\phi_2$ is replaced by $\phi_1$.

In the above relationships the reference direction is $\phi_1=\phi_2=0$ perpendicular to the connecting planes of the two axles; since the turning axles, as stated, turn in opposite directions, the positive rotation direction of $\phi_1$ is set against that of $\phi_2$.

Drives for such an inverse kinematic device are known, as for instance from CH 216 760 (D1), DE 1 145 455 (D2), DE 1 207 750 (D3), WO 80/01830 (D4), EP 0 176 749 (D5), SU 1 607 922 (D6), US 5 265 (D7), EP 0 584 301 (D8), EP 0 614 028 (D9).

These known devices represent several categories of solution: D1 and D2 are positive, geared drives, i.e. both the angular velocities $\phi_1$, $\phi_2$ and also the turning moments and power provided by the two axles are delivered by way of example by the drive, the correct angular relationships of $\phi_1$ and $\phi_2$ are prescribed by the drive, and no power exchange takes place between the two axles via the so-called middle member. This is, however, a purely mathematical concept: manufacturing and installation errors work themselves out in large loadings, above all on the various bearings.

D3 describes in principle a differential drive, which evens out the uneven running of the two parallel axles of the inverse kinematics device inherent in the construction. This is however at the price of a large power exchange via the quoted middle member, and on the other hand of a strong turning moment loading of the inverse kinematics device by the linking chain moved by the two axles.

D4 describes an energy store comprising a mass and spring element, D5 a hydraulic drive, D6 a similar drive with magnetic couplings, D8 finally a drive with two series coupled d.c. motors. This last named drive suffers, even if less obviously, from the same disadvantage as the solution with a differential drive, namely the loading on the inversion kinematic linking chain due to exchange turning moments. In D7 the drive comprises an induction motor, which provides only intermittent power, is expensive in manufacture and has a small efficiency. D8 finally describes a floating equalisation member connected between the two parallel axles, which on closer analysis however shows the same characteristics as the drives according to D1 and D2.

SUMMARY OF THE INVENTION

The aim of the present invention is the production of a drive for inverse kinematic devices, which has positive drive characteristics, but however avoids their disadvantages and is cost effective to manufacture. The aim is addressed in the characterising part of claim 1 with respect to its essential characteristics, in the claims dependent upon it with regard to further advantageous embodiments.

BRIEF DESCRIPTION OF THE DRAWINGS

The idea of the invention is more closely explained using the attached drawing by means of preferred embodiments. Shown are:

FIG. 3a, b a modification to the first embodiment, partly enlarged.

FIG. 4a a second embodiment in basic outline.

FIG. 4b a detail of the second embodiment in outline.

DETAILED DESCRIPTION OF THE DRAWINGS

Figure 1:
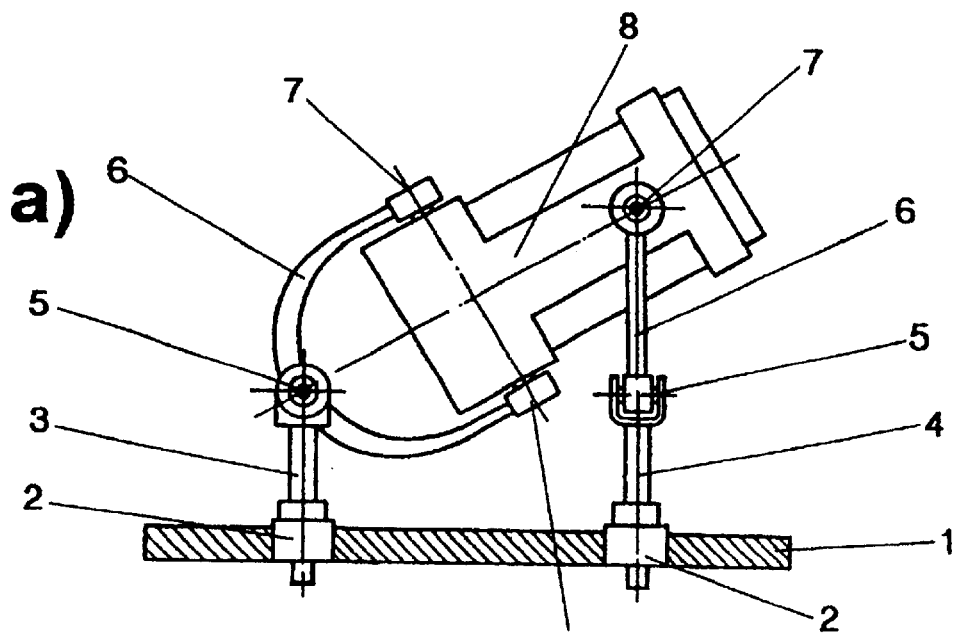
FIG. 1a, b, c the state of the art in outline, schematic outline and a schematic perspective.
Figure 1:
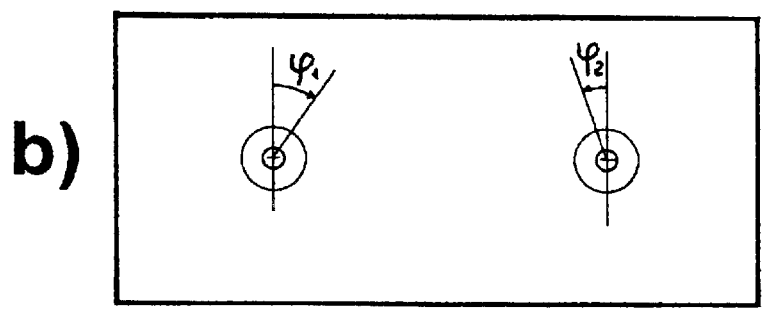
Figure 1:
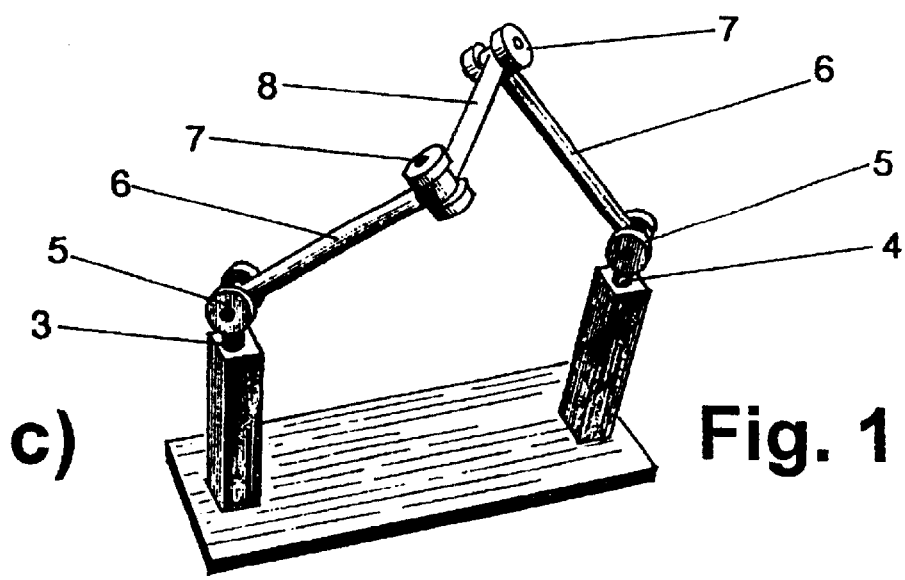

FIG. 1a the outline of an inversion kinematic internal mixing machine according to the state of the art, FIG. 1b its outline. A base plate 1 carries two axles 3, 4 each mounted in a main bearing 2. These are parallel to each other and moved in contrary motion. If axle 3 turns about the angle $\phi_1$, the angle of the axle 4 is $\phi_2$; the ratio of the angles is, as stated $$\tan\phi_1 = \frac{1}{2}\tan\phi_2$$

This also means that with the divergence values of $\tan\phi_1$, $\tan\phi_2$ also diverges, or that following a rotation of n·90° of the axle 3, axle 4 has also rotated by n·90°, where n=1,2,3,4 . . . .

FIG. 1c is the perspective representation of an inverse kinematic linking chain, which is described below in comparison to FIG. 1a. Each axle 3, 4 carries at its end a hinge link 5, whose turning axis is perpendicular to the direction of the axles 3, 4; in the positions $\phi_1=\phi_2$ the axes of the hinged links 5 stand perpendicular to each other. In FIG. 1c a rod 6 is connected to each hinged link 5, which has again a hinged link 7 at its end, whose axis again stands perpendicular to that of the hinged link 5. The hinged links 7 are also joined by a further rod, which here is named the middle member 8.

If one now observes FIG. 1a, then each rod 6 there is replaced by a fork 6 in FIG. 1c, in general and below called the edge member 6. The middle member 8 is here replaced by a tube-like element, which is designed to accept a container. The elements designated 5, 6, 7, 8 form half of a linking chain according to Bricard (1897) or a half cube belt according to Paul Schatz. The instrumental configurations of this linking chain are manifold and known.

Due to the uneven characteristics of the two angular velocities $\phi_1$, $\phi_2$ of the axles 3,4 any direct motorised drive—with the exception of that known from D8—cannot practically be considered. In the quoted book by Paul Schatz there is a representation of two adjacent oval wheels running together with a constant speed on their peripheries. In the description of this Figure it is however noted that this is not a technical solution, and the author has also not further pursued the application of such oval wheels.

Figure 2:
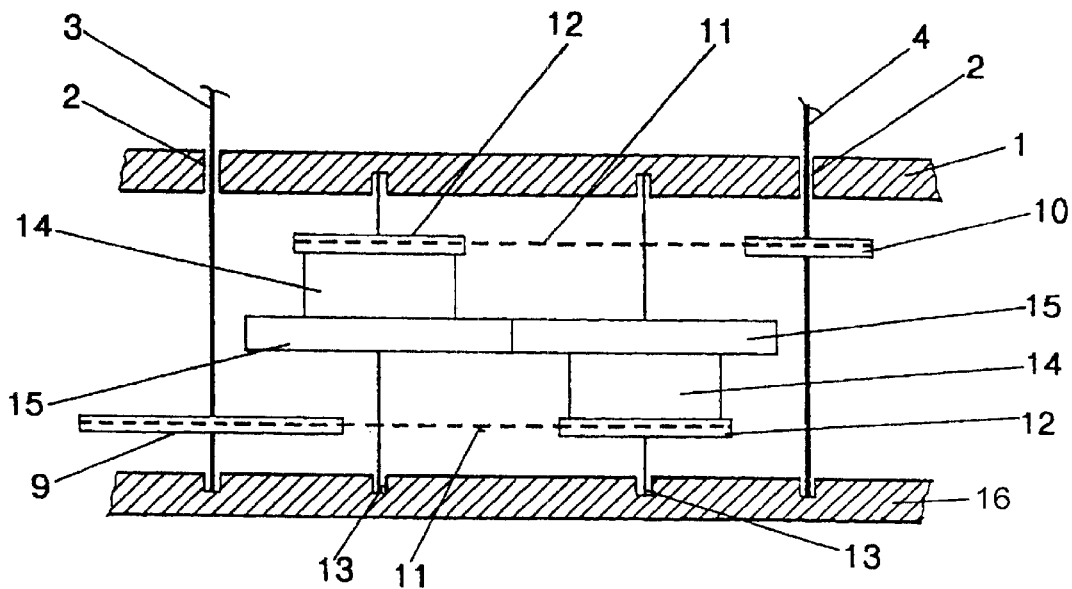
FIG. 2a, b a first embodiment in plan and basic outline, partly cut away.
Figure 2:
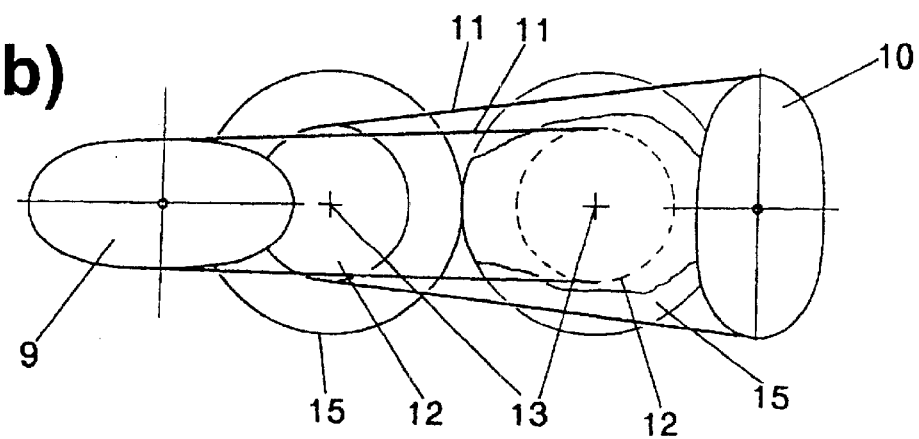

FIG. 2 shows schematically a first embodiment of a technical solution for a drive using oval wheels. These have a relationship of their large to their small diameters of $$\frac{l}{b} = 2.0$$

and in their rolling together satisfy the angular equation $\tan\phi_1 = \frac{1}{2}\tan\phi_2$.

FIG. 2a is a schematic outline, partly in section, FIG. 2b a plan view from below. The section runs through the base plate 1; the bearings 2 are shown schematically. In the illustration in FIG. 2a half the linking chain according to FIG. 1 is above the base plate and is—since it is state of the art—not discussed further.

A first oval wheel 9 is joined directly to the axle 3, similarly connected to the axle 4 is a second oval wheel 10; the oval wheels 9, 10 are for instance manufactured identically. Around the oval wheels 9, 10 run long extended traction elements 11, such as for instance v-belts or toothed belts, round cords, or chains, with a corresponding configuration of the periphery of each oval wheel 9, 10. Each traction element 11 also runs over a circular wheel 12, with the corresponding configuration, on an axle 13.

With the foreseen movement of the axles 3, 4 the peripheral velocities of the oval wheels 9, 10 are constant, and identical apart from the sense of rotation. In order to even out the faults due to non-parallelities of the traction elements 11—and to compensate for manufacturing and installation tolerances—the wheels 12 are each connected to the axles 13 via an elastic coupling 14 of a well known type of construction. The axles 13 rotate in a uniform manner in contrary motion. As an embodiment without limiting character, the elastic couplings 14 are connected to a toothed wheel 15 in each case, whereby these are in direct engagement. There are obviously many other possibilities of causing the wheels 12 to rotate uniformly. They are known to the specialist and are not part of the idea of the invention.

The axles 13 of the wheels 12 are for instance similarly mounted in the base plate 1. The other bearings of the axles 3, 4, 13 are in a plate 16, which is arranged parallel to the base plate and is joined to it.

If traction elements 11 are used, which have a suitable intrinsic elasticity, such as for instance round section cords made of an elastomer, then the elastic couplings 14 can be omitted. The presence of an elastic element is however essential in the power flow of the uniformly rotating axles—for instance axles 13—to the non-uniformly rotating axles 3, 4. The drive power to the uniformly rotating axles 13 is as a rule delivered by an electric motor, but can obviously comprise any suitable source of energy, even a manually operated crank; the drive is thus effected externally.

FIG. 3 is the representation of a modification of the elastic element in the power transmission, which is described in FIG. 2 as an elastic coupling 14. The traction element 11—as above a chain, a toothed belt, v-belt or an armoured round cord—runs in each case around two rollers 22 on the drive side, which are for instance symmetrically arranged on a pivoting arm 23. The pivoting arm 23 pivots about an axle 24 and is brought into the position where the traction element 11 has the greatest tension by the power of an elastic spring—shown here as a spiral spring. For better visibility the elastic element belonging to the oval wheel is shown enlarged. The elastic element comprising the elements with reference numbers 22, 23, 24, 25 is, as described arranged on the drive side of the traction element 11 and therefore does not have the role of a well known chain or belt tensioner, which basically is arranged on the powerless or at least low power drive side. It again undertakes the necessary evening out of the geometric deviations arising from the angular positions of the traction element 11.

It is within the concept of the invention to produce the elastic element working on the traction element 11 differently, as long as the task of the power dependent length compensation of the traction element 11 is addressed. The specialist will be conversant with other solutions than those shown.

FIG. 4 is a—although topologically identical, however constructionally different—modification of FIG. 2. FIG. 4a shows the modification in plan view from below, FIG. 4b is an outline of the elastic element. The latter is constructed as for instance a toothed wheel 15, which carries, flanged onto both sides, an elastic coupling 14. Each of the elastic couplings 14 buts onto a wheel 12 for the drive of a traction element 11 in each case. The lower wheel 12 in FIG. 4b drives the oval wheel 10 in a known manner; the upper in FIG. 4b drives the oval wheel 9 such that the associated traction element 11 runs around two guide rollers 26 and then lies on the outer rim of the oval wheel 9. Thereby the inner side of the traction element 11 lies on the wheel 12, its outer side on the oval wheel 9, which effects the reversal of the rotational sense from wheel 12 to the oval wheel 9.

The advantage of this arrangement is the saving of an arrangement for reversing the rotational sense of the wheels 12, with the cost of loss of symmetry.

Here also an elastic element—here the coupling 14—is attached to each traction element 11.

In all the arrangements described it can be useful to load the drive side of the traction elements 11 in each case additionally by the force of a conventional but weak chain tensioner—or another tensioning device matched to the traction element 11. This has no influence on the kinematic properties and serves only for the length compensation of the traction element 11.

What is claimed is:

1. A drive for an inverse kinematics device with two parallel axles moved in opposing directions and non-uniformly rotating, the axles having an angular relationship of $$\tan\phi_1 = \frac{1}{2} \tan\phi_2$$

and the drive is supplied from outside with power by at least one essentially uniformly rotating axle, wherein
   each of the axles carries an oval wheel, whose ovality corresponds to the angular relationship and which is firmly fixed to the associated axle and the periphery is designed for the positive acceptance of a traction element;
   at least one uniformly rotating wheel, driven from outside, is present, whose periphery is designed for the positive acceptance and drive of the traction element, two traction elements are present for the transmission of turning moments and power from the at least one wheel onto the oval wheels; and
   each drive line comprising said rotating wheel, traction element and oval wheel contains an elastic element, which can at least compensate for any impairment of the constancy of peripheral velocity of the oval wheels brought about by the misalignment of the traction elements, the elastic elements are arranged between the at least one uniformly rotating wheel and non-uniformly rotating oval wheels.

2. A drive for an inverse kinematics device according to claim 1, wherein said at least one uniformly rotating wheel is a total of two uniformly and counter rotating wheels, driven from outside.

3. A drive for an inverse kinematics device according to claim 2, wherein in each drive line the elastic element present is an elastic coupling.

4. A drive for an inverse kinematics device according to claim 2, wherein in each drive line the elastic element present is a tensioning device for the traction element.

5. A drive for an inverse kinematics device according to claim 3 or claim 4, wherein the traction element is a chain.

6. A drive for an inverse kinematics device according to claim 3 or claim 4, wherein the traction element is a toothed belt.

7. A drive for an inverse kinematics device according to claim 3 or claim 4, wherein in that the traction element is an armored round cord.

8. A drive for an inverse kinematics device according to claim 2, wherein the traction element is an elastic round cord.

9. A drive for an inverse kinematics device according to claim 1, wherein only one uniformly rotating wheel, driven from outside, is present, which however is arranged to drive two traction elements.

10. A drive for an inverse kinematics device according to claim 9, wherein
the wheel has two elastic couplings, each of which impact the drive of a traction element, the two traction elements surround the wheel, whereby the one traction element surrounds an oval wheel, the other by means of at least two guide rollers is applied with positive engagement to the other oval wheel, but does not surround it.

11. A drive for an inverse kinematics device according to claim 10, wherein the traction element is a chain.

12. A drive for an inverse kinematics device according to claim 10, wherein the traction element is a double sided toothed belt.

13. A drive for an inverse kinematics device according to claim 10, wherein the traction element is an armored round cord.

14. A drive for an inverse kinematics device according to claim 9, wherein the elastic element present in each drive chain is a tensioning element for the traction element.

15. A drive for an inverse kinematics device according to claim 9, wherein the traction element is an elastic round cord.

* * * * *

UNITED STATES PATENT AND TRADEMARK OFFICE
CERTIFICATE OF CORRECTION

PATENT NO.  : 6,435,995 B1
DATED       : August 20, 2002
INVENTOR(S) : Reinhold C. Salgo It is certified that error appears in the above-identified patent and that said Letters Patent is hereby corrected as shown below:

Column 1,
Line 42, replace "angular velocities $\varphi1, \varphi2$" with -- angular velocities $\omega1, \omega2$ --
Line 44, replace "by the drive," with -- by the drive; --

Column 2,
Line 29, replace "FIG 1a the" with -- FIG 1a is the --
Line 62, replace "velocities $\varphi1, \varphi2$" with -- velocities $\omega1, \omega2$ --

Column 4,
Line 45, the equation contains a "," this should be removed.

Signed and Sealed this

Twenty-eighth Day of January, 2003

JAMES E. ROGAN
*Director of the United States Patent and Trademark Office*